(12) United States Patent
Hou et al.

(10) Patent No.: US 11,096,192 B2
(45) Date of Patent: Aug. 17, 2021

(54) ELECTRONIC DEVICE AND WIRELESS COMMUNICATION METHOD FOR PROXIMITY BASED COMMUNICATIONS VIA A SIDELINK

(71) Applicant: Sony Corporation, Tokyo (JP)

(72) Inventors: Yanzhao Hou, Beijing (CN); Xiaofeng Tao, Beijing (CN); Zhaoqi Peng, Beijing (CN); Yuming Liu, Beijing (CN); Xin Guo, Beijing (CN); Yanyan Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 16/605,807

(22) PCT Filed: Jul. 4, 2018

(86) PCT No.: PCT/CN2018/094454
§ 371 (c)(1),
(2) Date: Oct. 17, 2019

(87) PCT Pub. No.: WO2019/011168
PCT Pub. Date: Jan. 17, 2019

(65) Prior Publication Data
US 2020/0128562 A1    Apr. 23, 2020

(30) Foreign Application Priority Data

Jul. 10, 2017   (CN) .......................... 201710556453.6

(51) Int. Cl.
*H04W 72/04* (2009.01)
*H04W 72/12* (2009.01)
(Continued)

(52) U.S. Cl.
CPC ......... *H04W 72/121* (2013.01); *H04L 5/0007* (2013.01); *H04L 5/0037* (2013.01);
(Continued)

(58) Field of Classification Search
CPC ........... H04W 72/121; H04W 72/1242; H04W 72/1268; H04W 72/048; H04W 72/1263;
(Continued)

(56) References Cited

U.S. PATENT DOCUMENTS

2017/0099127 A1    4/2017  Byun et al.
2018/0049168 A1*   2/2018  Ryu ...................... H04L 5/0044
(Continued)

FOREIGN PATENT DOCUMENTS

| CN | 105827385 A | 8/2016 |
| CN | 106788926 A | 5/2017 |
| CN | 106788928 A | 5/2017 |

OTHER PUBLICATIONS

R1-1708969, Ericsson, Short TTI transmission for PC5-based V2X, May 15-19, 2017 (Year: 2017).*
(Continued)

*Primary Examiner* — Hassan Kizou
*Assistant Examiner* — Mahbubul Bar Chowdhury
(74) *Attorney, Agent, or Firm* — Xsensus LLP

(57) ABSTRACT

The present disclosure relates to an electronic device and a wireless communication method. An electronic device for wireless communication according to one embodiment comprises a processing circuit, wherein the processing circuit is configured to, when a user equipment carries out short-range service communication at a short transmission time interval smaller than a first transmission time interval, implement control so that at least two mutually independent transmission blocks, each having a short transmission time interval, are transmitted in the same subframe, wherein the length of the subframe is the same as the first transmission time interval.

17 Claims, 14 Drawing Sheets

(51) Int. Cl.
*H04L 5/00* (2006.01)
*H04W 92/18* (2009.01)

(52) U.S. Cl.
CPC .......... *H04L 5/0044* (2013.01); *H04L 5/0064* (2013.01); *H04W 72/1242* (2013.01); *H04W 72/1268* (2013.01); *H04W 92/18* (2013.01)

(58) Field of Classification Search
CPC . H04W 72/1278; H04W 92/18; H04W 88/02; H04W 4/70; H04W 4/44; H04W 4/80; H04W 4/40; H04W 4/46; H04W 24/00; H04L 5/0007; H04L 5/0037; H04L 5/0044; H04L 5/0064; H04L 5/0092; H04L 5/0053; H04L 29/08; H04L 67/12; H04B 17/318
See application file for complete search history.

(56) References Cited

U.S. PATENT DOCUMENTS

| | | | |
|---|---|---|---|
| 2018/0098337 A1* | 4/2018 | Lee | H04W 72/1278 |
| 2018/0255543 A1* | 9/2018 | Takeda | H04W 72/04 |
| 2019/0116583 A1* | 4/2019 | Sahlin | H04L 5/0007 |
| 2019/0373567 A1* | 12/2019 | Takeda | H04W 52/34 |
| 2020/0275458 A1* | 8/2020 | Khoryaev | H04W 4/44 |

OTHER PUBLICATIONS

R1-1709000, Ericsson, Short TTI for increasing the reliability for PC5-based V2X, May 15-19, 2017 (Year: 2017).*
R1-1704655, ZTE, Discussion on Short TTI with eV2X, Apr. 3-7, 2017 (Year: 2017).*
International Search Report and Written Opinion dated Aug. 29, 2018 for PCT/CN2018/094454 filed on Jul. 4, 2018, 8 pages including English Translation of the International Search Report.

* cited by examiner

ELECTRONIC DEVICE AND WIRELESS COMMUNICATION METHOD FOR PROXIMITY BASED COMMUNICATIONS VIA A SIDELINK

CROSS-REFERENCE TO RELATED APPLICATIONS

The present application is based on PCT filing PCT/CN2018/094454, filed Jul. 4, 2018, which claims priority to CN 201710556453.6, filed Jul. 10, 2017, the entire contents of each are incorporated herein by reference.

FIELD OF THE INVENTION

The present disclosure relates generally to the field of wireless communication, and more particularly, to an electronic device for wireless communication, an electronic device for user equipment side, and a wireless communication method.

BACKGROUND OF THE INVENTION

A sidelink subframe based on PC5 in the Third Generation Partnership Project (3GPP) R14 is composed of 14 Orthogonal Frequency Division Multiplexing (OFDM) symbols, including Automatic Gain Control (AGC) setting and Guard Gap (GAP) symbols, Demodulation Reference Signal (DMRS) symbols as well as data symbols. With the further advancement of researches, in view of requirements for low latency and high reliability for Vehicle-to-X (V2X) services, for example, PC5 operations supporting use of a short Transmission Time Interval (sTTI) are proposed. The sTTI is smaller than the length of one subframe, and can be flexibly set as required. For Sidelink V2X, the structure of the sTTI is more suitable, because the high speed movability of a vehicle causes a possibility that a difference in the timing of the vehicle will occur, and makes it difficult to acquire instantaneous information of the vehicle.

The adoption of the sTTI can satisfy requirements such as low latency and the like for the V2X services. However, in a communication process, a vehicle using the traditional subframe length TTI possibly will conflict with a vehicle using the sTTI at the time of selection/use of communication resources.

SUMMARY OF THE INVENTION

In the exemplary scenario where a R14 user equipment and R15 user equipments co-exist as shown in FIG. 8, due to the introduction of a sTTI, the following problems may occur: in a case where a proximity-based service communication based on PC5 adopts a sTTI having a length of seven symbols, as shown in FIG. 9, it is possible that only one time slot is used for transmission in a certain subframe, while in a process where the R14 user equipment performs perception, the R14 user equipment will mistakenly deem that the subframe has the occupation situation as shown in FIG. 10, and thus will obtain an inaccurate S-RSSI result on the subframe, resulting in inaccuracy of a perception measurement.

A brief summary of embodiments of the present invention is given below to provide a basic understanding of some aspects of the present invention. It should be understood that the summary is not an exhaustive summary of the present invention. It does not intend to define a key or important part of the present invention, nor does it intend to limit the scope of the present invention. The object of the summary is only to briefly present some concepts, which serves as a preamble of the detailed description that follows.

According to an embodiment, an electronic device for wireless communication comprises a processing circuitry configured to: in a case where a user equipment performs a proximity-based service communication with a short transmission time interval which is less than a first transmission time interval, perform control so as to transmit, in a same subframe, at least two transmission blocks independent from each other and each having a short transmission time interval, wherein the length of the subframe is equal to the first transmission time interval.

According to another embodiment, an electronic device for wireless communication comprises a processing circuitry configured to: in a case where a user equipment performs a proximity-based service communication with a short transmission time interval which is less than a first transmission time interval, determine scheduling assignment signalling which at least comprises one scheduling assignment signalling having a length equal to the first transmission time interval; and perform control so as to transmit, in a same subframe, at least two transmission blocks each having a short transmission time interval, wherein the length of the subframe is equal to the first transmission time interval.

According to still another embodiment, a wireless communication method comprises: in a case where a user equipment performs a proximity-based service communication with a short transmission time interval less than a first transmission time interval, transmitting, in a same subframe, at least two transmission blocks independent from each other and each having a short transmission time interval, wherein the length of the subframe is equal to the first transmission time interval.

According to another embodiment, an electronic device for user equipment side comprises a processing circuitry configured to: perform control to receive indication information from a control node; and in a case where the user equipment performs a proximity-based service communication with a short transmission time interval less than a first transmission time interval, perform control based on the indication information such that a transmission block of the user equipment is transmitted in a same subframe with another transmission block having a short transmission time interval, wherein the length of the subframe is equal to the first transmission time interval.

According to still another embodiment, an electronic device for user equipment side comprises a processing circuitry configured to: in a case where the user equipment performs a proximity-based service communication with a first transmission time interval, perform control to receive scheduling assignment signalling associated with at least two transmission blocks, transmitted in a same subframe, which are independent from each other and each having a short transmission time interval less than the first transmission time interval, wherein the length of the subframe is equal to the first transmission time interval.

Through embodiments of the present invention, by transmitting transmission blocks having a sTTI in combination in a same subframe, it is possible to raise a filling degree of a subframe where sTTI transmission occurs, thereby being advantageous to solution of a problem in regard to fragmentation of time resources and/or a problem in regard to inaccuracy in a perception measurement.

BRIEF DESCRIPTION OF THE DRAWINGS

The present invention could be better understood with reference to the description given below in combination with the appended drawings, wherein throughout the drawings, identical or like reference signs are used to represent identical or like components. The appended drawings together with the detailed description below are included in the specification and form a part of the specification, to further describe preferred embodiments of the present invention and explain the principles and advantages of the present invention by way of examples. In the appended drawings.

DETAILED DESCRIPTION

Hereinafter, embodiments of the present invention will be described with reference to the appended drawings. Elements and features described in one figure or one embodiment of the present invention may be combined with elements and features described in one or more other figures or embodiments. It should be noted that, for the sake of clarity, representation and description of components and processing known to those ordinarily skilled which are irrelevant to the present invention are omitted in the appended drawings and the description.

Figure 1:
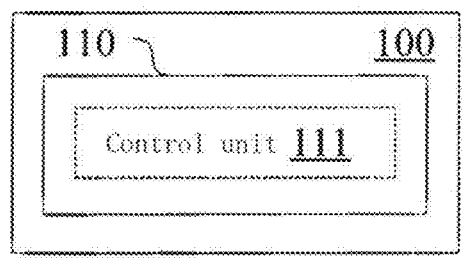
FIG. 1 is a block diagram showing a configuration example of an electronic device for wireless communication according to an embodiment of the present invention.

As shown in FIG. 1, an electronic device 100 for wireless communication according to an embodiment of the present invention comprises a processing circuitry 110. The processing circuitry 110 may, for example, be realized as a specific chip, chipset or central processing unit (CPU) or the like.

The processing circuitry 110 comprises a control unit 111. It should be noted that, although the control unit 111 and other units are shown in the form of functional blocks in the figure, it should be understood that the functions of the control unit 111 and the other units may also be realized by the processing circuitry 110 as a whole, but not necessarily realized by discrete, actual components in the processing circuitry 110. In addition, although the processing circuitry 110 is shown by one frame in the figure, the electronic device 100 may comprise a plurality of processing circuitries, and can distribute the functions of the control unit 111 and the other units to the plurality of processing circuitries so as to implement corresponding functions through cooperative operations of the plurality of processing circuitries.

The control unit 111 is configured to: in a case where a user equipment performs a proximity-based service communication with a short transmission time interval which is less than a first transmission time interval, perform control so as to transmit, in a same subframe, at least two transmission blocks independent from each other and each having a short transmission time interval, wherein the length of the subframe is equal to the first transmission time interval.

The term "independent from each other" referred to herein refers to transmission blocks to be transmitted in different subframes respectively without performing a combination, which may either comprise transmission blocks of different user equipments or comprise transmission blocks of a same user equipment which can be transmitted in different subframes respectively. To sum up, without performing the above-mentioned processing by the control unit 111, transmission blocks independent from each other will be transmitted in different subframes, respectively, whereas through the processing by the control unit 111, transmission blocks independent from each other are caused to be transmitted in combination in a same subframe, making it possible to raise a filling degree of a subframe, thereby further being advantageous to solution of a problem in regard to fragmentation of time resources and a problem in regard to inaccuracy in perception measurements on a user equipment using a short transmission time interval by a user equipment using a long transmission time interval.

According to an embodiment, a structure of the sub-frame in which at least two transmission blocks independent from each other are transmitted may be identical to that of a subframe of a proximity-based service communication performed with the first transmission time interval.

For example, the first transmission time interval (which hereinafter may be referred to as TTI) may include 14 orthogonal frequency division multiplexing symbols, and the short transmission time interval (which hereinafter may be referred to as sTTI) may include up to 7 orthogonal frequency division multiplexing symbols.

Figure 12:
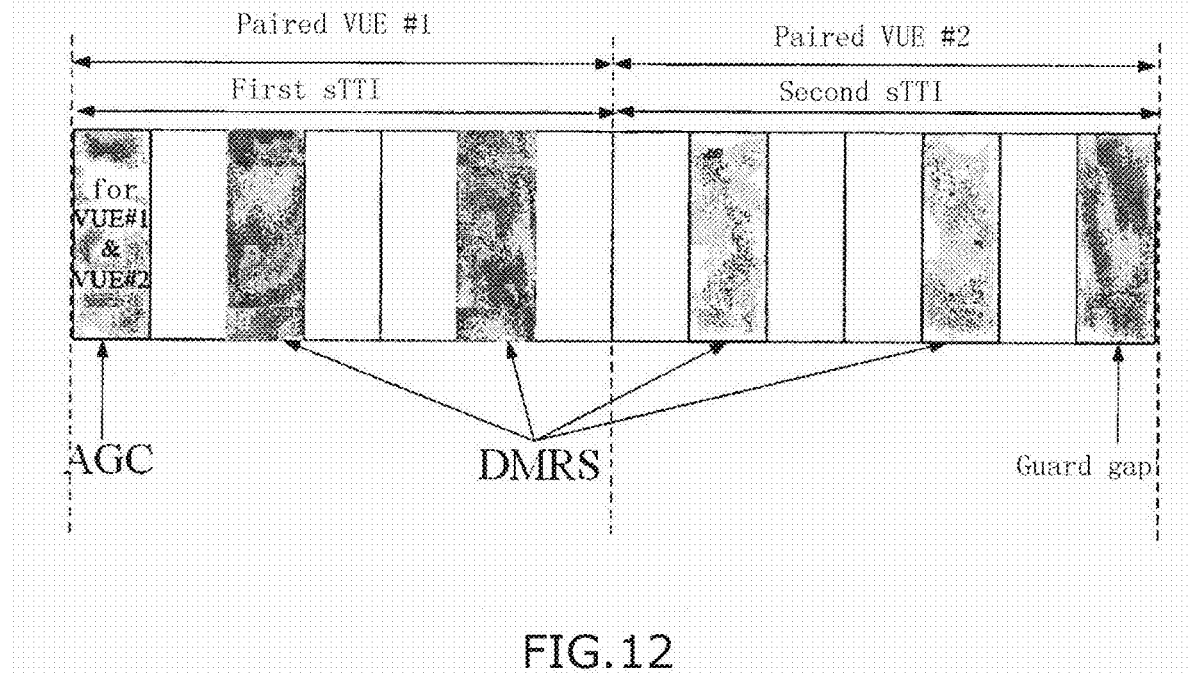
FIG. 12 shows an example of a subframe structure under a pairing situation.

More specifically, as shown in FIG. 12, in a subframe, a first symbol is AGC setting, third, sixth, ninth and twelfth symbols are DMRS symbols, and a fourteenth symbol serves as a guard gap GAP. In the example as shown in FIG. 12, the subframe contains transmission blocks (corresponding to a first sTTI and a second sTTI, respectively) of two user equipments such as vehicle user equipments (VUEs). Accordingly, the AGC is directed to the two user equipments VUE1 and VUE2.

However, the present invention is not limited to the above example. The TTI may comprise any number of OFDM symbols, and the sTTI may comprise any number of OFDM symbols which is less than the number of the TTI. Further, for one TTI, a variety of sTTI may exist, and it is possible to transmit any number of transmission blocks having sTTIs having equal lengths or different lengths in combination in one subframe having a length equal to that of the TTI, as long as the sum of the lengths of these sTTIs does not exceed the length of the TTI.

The control unit 111 can determine, according to a variety of manners, transmission blocks to be transmitted in a same subframe. For example, according to an embodiment, in a case where information to be transmitted has a priority, the control unit 111 can be configured to determine transmission blocks to be transmitted in a same subframe based on the priority of information to be transmitted. For example, it is possible to preferentially cause transmission blocks corresponding to identical or approximate priorities to be transmitted in a same subframe. However, the present invention is not limited hereto. It is also possible to determine a combination of transmission blocks based on, for example, a data amount of information, positions and movement speeds of user equipments, etc., or it is also possible to, for example, randomly determine a combination of transmission blocks without considering the above factors.

In addition, although the example where vehicles serve as user equipments is mentioned previously, the present invention is not limited hereto. The proximity-based service communication may, for example, comprise Machine Type Communication MTC, Device-to-Device D2D communication, Vehicle-to-X V2X communication, Internet of Things IOT communication, etc.

Further, according to different communication configurations, a control node which performs determination and control of a combination of transmission blocks may be either realized at base station side or realized at user equipment side. For V2X application, the control node may also be realized at roadside equipment side. For example, for V2X, there are two V2X communication modes; by taking resource allocation as an example, two resource allocation manners are mainly included, one of which is base station scheduling (mode 3), and the other of which is UE autonomous selection (mode 4). Modes 3 and 4 further include priority fields with respect to uplink transmission, for judging a priority of information and performing a comparison and a power adjustment in case of a conflict.

Figure 2:
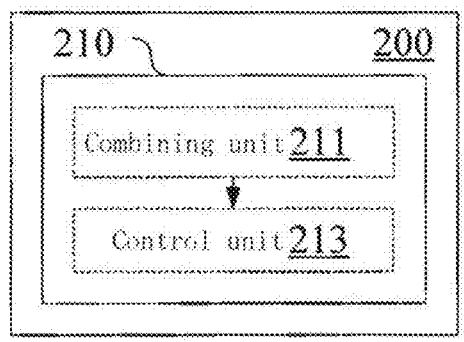
FIG. 2 is a block diagram showing a configuration example of an electronic device for wireless communication according to another embodiment.

As stated previously, transmission blocks independent from each other may include transmission blocks from different user equipments. Accordingly, according to an embodiment, it is possible to combine user equipments which use a short transmission time interval. As shown in FIG. 2, the electronic device 200 for wireless communication according to the present embodiment comprises a processing circuitry 210, which comprises a combining unit 211 and a control unit 213.

The combining unit 211 is configured to combine user equipments which use a short transmission time interval. Accordingly, the control unit 213 is configured to perform control such that transmission blocks of the combined user equipments are transmitted in a same subframe.

According to an embodiment, the combining unit 211 can perform the combination according to a similarity between the user equipments. The similarity can be determined based on a priority of information to be transmitted, a data amount of information to be transmitted, positions of user equipments, movement speeds of user equipments, etc.

The processing related to combining transmission blocks has been described above. The processing can be performed based on a predetermined trigger condition.

Referring still to FIG. 1, according to an embodiment, the control unit 111 can be configured to perform, when a predetermined condition is satisfied, the control such that transmission blocks independent from each other are transmitted in a same subframe.

Specifically, the predetermined condition may comprise: a plurality of user equipments sharing a same resource pool perform proximity-based service communications with the first transmission time interval and a short transmission time interval, respectively. When the predetermined condition is satisfied, a problem such as occurrence of an inaccurate perception measurement to a user equipment using the TTI due to a user equipment using the sTTI and the like may arise, and thus it is possible to trigger transmission of transmission blocks in combination to mitigate the problem.

Further, the predetermined condition may further comprise: a channel busy rate of the resource pool is higher than a predetermined level; and a number ratio of the user equipments using the first transmission time interval to the user equipments using a short transmission time interval is in a predetermined range.

The trigger condition will be described below by taking vehicles (for example, referred to as R14 vehicles) which do not support the sTTI and vehicles (for example, referred to as R15 vehicles) which support the sTTI as examples of the user equipments. In a certain resource pool, an event is triggered when the following two conditions are simultaneously satisfied:

$$CBR > Coordinate_{thr}; \quad \text{Condition 1:}$$

$$ratioTypemin < N_{R14}/N_{R15} < ratioTypemax \quad \text{Condition 2:}$$

Where, CBR represents a channel busy rate, which can represent a proportion of subchannels whose S-RSSIs exceed a certain threshold; $Coordinate_{thr}$ represents a threshold of the channel busy rate; $NR_{14}$, $NR_{15}$ represent numbers of the R14 and R15 vehicles in the resource pool, respectively; ratioTypemin and ratioTypemax represent an upper limit and a lower limit of the number ratio, respectively.

In case of a very small load of the resource pool, both the two kinds of vehicles have sufficient resources to be selected, and co-existence will not produce influences on the performance. Therefore, Condition 1 is adopted as one of preconditions of a mechanism to be triggered.

In addition, when there are a few R14 vehicles or there are a few R15 vehicles, co-existence will produce influences only on a few vehicles. In this case, influences on the overall performance within a cell are not great, and it is possible not to apply a pairing mechanism, so as to prevent addition of additional signalling interactions. Therefore, Condition 2 is adopted as the other trigger condition.

In the present exemplary embodiment, the pairing mechanism will not be triggered unless the two conditions are simultaneously satisfied. Moreover, it is possible to set a correspondence between $Coordinate_{thr}$ and (ratioTypemin, ratioTypemax). In order words, it is possible to adopt a plurality of combinations of the thresholds Coordinate$_{thr}$ and (ratioTypemin, ratioTypemax). For example, corresponding to Coordinate$_{thr}$=v1, (ratioTypemin, ratioTypemax) may be (50%, 80%); that is, when CBR>Coordinate$_{thr}$=v1 is adopted as Condition 1, Condition 2 is 50%<NR$_{14}$/NR$_{15}$<80%, and the pairing mechanism will not be triggered unless Condition 1 and Condition 2 are satisfied. The combinations of the thresholds may, for example, be configured in advance at network side, and the control node such as the eNodeB can optimize the thresholds.

Further, it is also possible to set a predetermined condition related to a communication status of the user equipment using the first transmission time interval, for example: the frequency of transmission failure of a user equipment using the first transmission time interval reaches a predetermined level; or the proportion of undecodable scheduling assignment signaling received by a user equipment using the first transmission time interval reaches a predetermined level.

The trigger condition will be described below by taking a Mode 4 R14 vehicle as an example of the user equipment using the first transmission time interval.

Condition 3: Triggering upon frequent transmission failure of the Mode 4 vehicle resulting from sensing result deviations.

Assuming that the Mode 4 R14 vehicle performs transmission using resources in a candidate resource set (determined by a sensing result), with a probability of its transmission failure being P$_{CRSfail}$, when the transmission failure is frequent and lasts for a period of time, the Mode 4 R14 vehicle can report this situation to the control node such as the eNodeB and trigger the event. Wherein, the threshold value of the failure probability and a trigger time length can be configured by the base station according to a current resource pool situation in the cell, and if the base station performs no configuration, it is possible to use pre-configured information.

The reporting activity and parameters may be configured by the eNodeB through RRC signalling, or be pre-configured in SIB.

Further, the eNodeB can, according to CBR and NR$_{14}$/NR$_{15}$ in the resource pool when the Mode 4 R14 vehicle is reporting the situation, continuously optimize and correct parameters in a judgment mechanism inside the eNodeB.

Condition 4: Triggering upon receipt of a large number of undecodable "error" SAs by the Mode 4 vehicle.

Since the R14 vehicles cannot decode short SAs sent by the R15 vehicles, when they receive short SAs, they will deem that the short SAs are "error" SAs, and will not perform decoding. When a proportion occupied by the "error" SAs in all SAs monitored by the R14 vehicles within a period of time is too high, it is possible to perform configuration by the base station according to a current pool resource situation in the cell, and if the base station performs no configuration, it is possible to use pre-configured information.

Similarly, the reporting activity and parameters may be configured by the eNodeB through RRC signalling, or be pre-configured in SIB. The eNodeB will, according to CBR and NR$_{14}$/NR$_{15}$ in the resource pool when the Mode 4 R14 vehicle is reporting the situation, continuously optimize and correct parameters in a judgment mechanism inside the eNodeB.

The above trigger conditions are directed to processing performed at a central control node such as the base station and the like. However, for example when the vehicles (or other types of user equipments) are outside network coverage, there is no central control node to perform control and notification with respect to a vehicle co-existence situation. In this situation, some application instances for R15 V2X include but are not limited to vehicle queuing, cooperative driving and Extended Sensor and the like. In these instances, frequent sTTI transmission will be performed between the vehicles, and in order to ensure backward compatibility, the R15 vehicles can trigger the pairing mechanism and a subsequent compatible SA sending scheme when finding existence of the R14 vehicles therearound.

Taking the vehicle queuing as an example, when a manager of the R15 vehicle queue finds existence of the R14 vehicles therearound, the event is triggered at the manager of the vehicle queue, and the manager can notify members of the vehicle queue, and adopt the pairing mechanism when allocating resources for the members of the vehicle queue, such that sTTI transmission of the members fill in a subframe for transmission. In addition, it is possible to notify paired vehicles of how to send SAs.

For the Extended Sensor instance, the R15 vehicles can, when finding existence of the R14 vehicles therearound, initiatively trigger the pairing mechanism without needing to report, or can trigger the pairing mechanism after notification by the control node (similar to the base station and the manager of the vehicle queue and the like).

The above embodiment relates to sending of Scheduling Assignment (SA) signalling and a situation where the user equipment using the first transmission time interval receives undecodable SAs. The 3GPP desires that PC5 operations using the sTTI can co-exist in an SA format same as or different from operations in the R14 vehicles in a same resource pool. In Sidelink transmission, SAs are transmitted on a Physical Sidelink Control Channel (PSCCH), and they at least are capable of indicating positions and durations of related data. By decoding the SAs, the user equipment can sense corresponding data so as to acquire its energy or Physical Sidelink Shared Channel-Reference Signal Receiving Power (PSSCH-RSRP). For example, for transmission mode 4, the user equipment needs a sensing operation to determine a candidate resource set, one method is decoding SAs, and the other method is measuring a Sidelink Receiving Signal Strength Indication (S-RSSI) value of a subframe, i.e., energy sensing.

Next, the problem will be further described, wherein R14, R15 user equipments are taken as examples of the user equipments.

For the R15 user equipment, if SAs are also transmitted adopting the sTTI, the R14 user equipment cannot decode the SAs, and thereby cannot perform a PSSCH-RSRP measurement, thus influencing a perception operation. In addition, even if in a case where the R14 user equipment can decode the SAs, the R14 user equipment is capable of obtaining information in the R15 SAs but still cannot perform transmission using one time slot, thus causing fragmentation of time resources. The above problem will influence a resource (re-) selection process of the R14 user equipment and lower the system performance.

Figure 3:
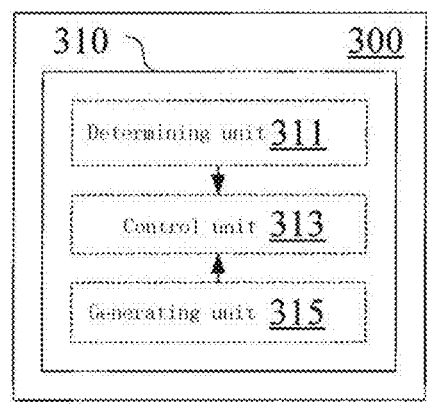
FIG. 3 is a block diagram showing a configuration example of an electronic device for wireless communication according to still another embodiment.

In view of the foregoing problem, an electronic device for wireless communication according to an embodiment is further configured to determine a transmission manner and/or content of scheduling assignment signalling. As shown in FIG. 3, an electronic device 300 comprises a processing circuitry 310, which comprises a determining unit 311 and a control unit 313.

The determining unit 311 is configured to determine, according to transmission blocks to be transmitted in a same subframe, a transmission manner and/or content of scheduling assignment signalling for the subframe.

In addition to the functions of the corresponding units explained previously with reference to FIG. 1 and FIG. 2, the control unit 313 can perform control to transmit scheduling assignment signalling, as determined.

Specifically, the transmission manner of the scheduling assignment signalling may comprises: transmitting one scheduling assignment signalling having a length equal to the first transmission time interval; transmitting one scheduling assignment signalling having a length equal to the first transmission time interval and n scheduling assignment signallings having lengths respectively corresponding to short transmission time intervals of transmission blocks in the subframe; or transmitting n scheduling assignment signallings having a length equal to the first transmission time interval, where n is the number of transmission blocks in the subframe.

According to an embodiment, the scheduling assignment signalling may be realized by SCI format (Sidelink Control Information format), and the determining unit 311 can be further configured to add information related to a transmission resource into a reserved bit of the SCI format.

For example, the determining unit 311 can be configured to add information related to a transmission resource into a reserved bit of the scheduling assignment signalling; and the control unit 313 can perform control to notify a definition of the added information to the user equipment in a system information block.

Next, the specific manner of determining the transmission manner and/or content of the scheduling assignment signalling will be described in combination with a specific example. It should be understood that the specific details in the following example are only illustrative but not limiting.

The R15 vehicles performing transmission with the sTTI will perform transmission in one subframe after pairing, which will solve the problems in regard to fragmentation of time resources and inaccuracy in S-RSSI results. Further, to solve the problem that the R14 vehicle cannot decode short SAs, paired users need to send at least one SA whose length is one subframe, in the format of R14 SAs, for example, by adopting SCI format 1. It could be understood that, we can also adopt the manner of adding a new SCI format for implementation.

First, content, i.e., analysis, in each domain of SCI format 1 is as shown in the following Table 1.

TABLE 1

| Domains | Bits | Descriptions | Analyses |
|---|---|---|---|
| Priority | 3 | setting a priority by an application layer, to reflect its latency demand | service priorities of paired vehicles are identical or approximate |
| Resource reservation | 4 | always set to "0000" in Mode 3 | |
| MCS | 5 | decided by the eNodeB according to CQI, IBLER, PC and ICIC, and indicated in SL grant | since paired vehicles perform transmission in a same subframe, the base station can configure a same MCS therefor when positions are closer |
| Frequency resource position of initial transmission and re-transmission | $\lceil \log_2 (N_{subchannel}^{SL} (N_{subchannel}^{SL} + 1)/2) \rceil$ | equal to RIV 5-13 bits | its difference value is equal to a difference between index numbers of start subchannels |
| Time interval of initial transmission and re-transmission | 4 | having a fixed value $SF_{gap}$ and configured in SL grant (mode 3) | two paired vehicles are consistent (mode 3) |
| Re-transmission index | 1 | indicating a subframe position of initial transmission and configured in SL grant (mode 3) | two paired vehicles are consistent (mode 3) |
| Reserved bit | — | — | — |

According to a difference between information needed to be contained in SAs for two paired users, the following three schemes are provided as exemplary embodiments:

Scheme 1: Transmitting one re-designed traditional SA

In the pairing mechanism, if two paired sTTI transmission come from a same VUE, or paired vehicles are at close positions and simultaneously perform transmission, for example, vehicle queue members, cooperative driving vehicles and the like, SA content of the two paired vehicles will be very similar. Through the analyses in Table 1, an exclusive difference that the two may have will appear in the domain "frequency resource position of initial transmission and re-transmission", and a calculation method of this domain value is as follows:

if $(L_{subCH}-1) \leq \lfloor N_{subCH}/2 \rfloor$ then $RIV = N_{subCH}(L_{subCH}-1) + n_{subCH}^{start}$ else $RIV = N_{subCH}(N_{subCH}-L_{subCH}+1) + (N_{subCH}-1-n_{subCH}^{start})$ Where $N_{subcH}$ is a number of all subchannels in the resource pool which is decided by high layer parameter numSubchannel-r14.

Being approximate in terms of message size is one of screening criteria of paired objects. When this point is satisfied, the two vehicles will be assigned with identical numbers of subchannels, and then values of the paired vehicles in the domain "frequency resource position of initial transmission and re-transmission" may have no difference, or have a difference only in the index number $n_{subCH}^{start}$ of start subchannel. Therefore, it is possible to represent a difference between frequency resource positions of the two paired users by using a reserved bit in SCI format 1. A newly added domain in the reserved bit is named "RIV offset", that is, RIV1−RIV2=RIV offset=$n_{subCH}^{start}$−$n_{subCH2}^{start}$. Its definition will be configured for the vehicles in SIB.

Figure 14:
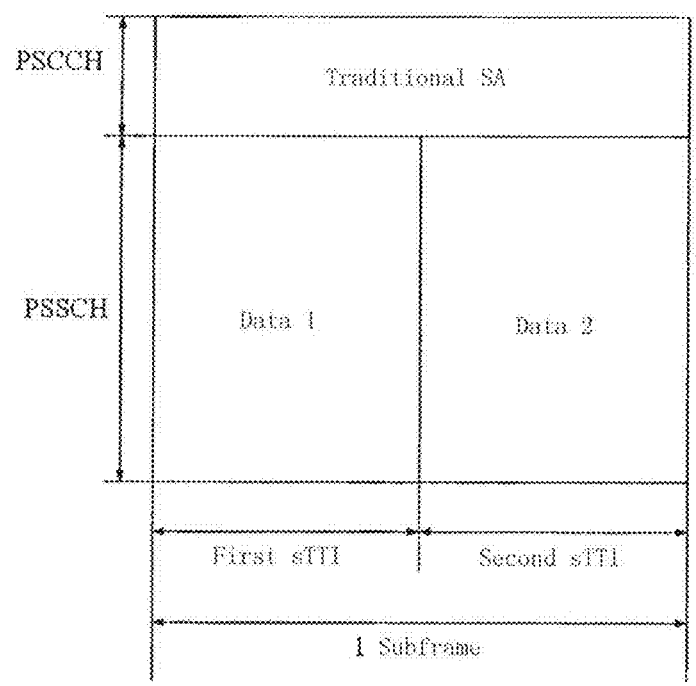
FIG. 14 through FIG. 16 are schematic views for explaining scheduling assignment signalling.

At this time, the two paired vehicles only need to send one traditional SA, as shown in FIG. 14. Content of the SA is as shown in Table 2.

TABLE 2

| Domains | Bits | Descriptions | Analyses |
|---|---|---|---|
| Priority | 3 | setting a priority by an application layer, to reflect its latency demand | service priorities of paired vehicles are identical |
| Resource reservation | 4 | always set to "0000" in Mode 3 | |
| MCS | 5 | decided by the eNodeB according to CQI, IBLER, PC and ICIC, and indicated in SL grant | since paired vehicles perform transmission in a same subframe, the base station can configure a same MCS therefor when positions are closer |
| Frequency resource position of initial transmission and re-transmission | $\lceil \log_2 (N_{subchannel}^{SL} (N_{subchannel}^{SL} + 1)/2) \rceil$ | equal to RIV 5-13 bits | its difference value is equal to a difference between index numbers of start subchannels |
| Time interval of initial transmission and re-transmission | 4 | having a fixed value $SF_{gap}$ and configured in SL grant (mode 3) | two paired vehicles are consistent (mode 3) |
| Re-transmission index | 1 | indicating a subframe position of initial transmission and configured in SL grant (mode 3) | two paired vehicles are consistent (mode 3) |
| Reserved bit (RIV offset) | $0 \sim \lceil \log_2 (N_{subCH} - 2L_{subCH}) \rceil$ | | definition will be configured in SIB |
| Reserved bit | — | — | |

Scheme 2: Transmitting one re-designed traditional SA and two short SAs

In an actual perception measurement, the mode 4 vehicles only need content of the following three domains in SCI format 1: priority; frequency resource position of initial transmission and re-transmission; resource reservation (only mode 4).

Therefore, as long as the three domains of the two paired users can be described in one traditional SA (as shown in Scheme 1), then for the R14 vehicles, one traditional SA has been enough to perform perception operations.

Figure 15:
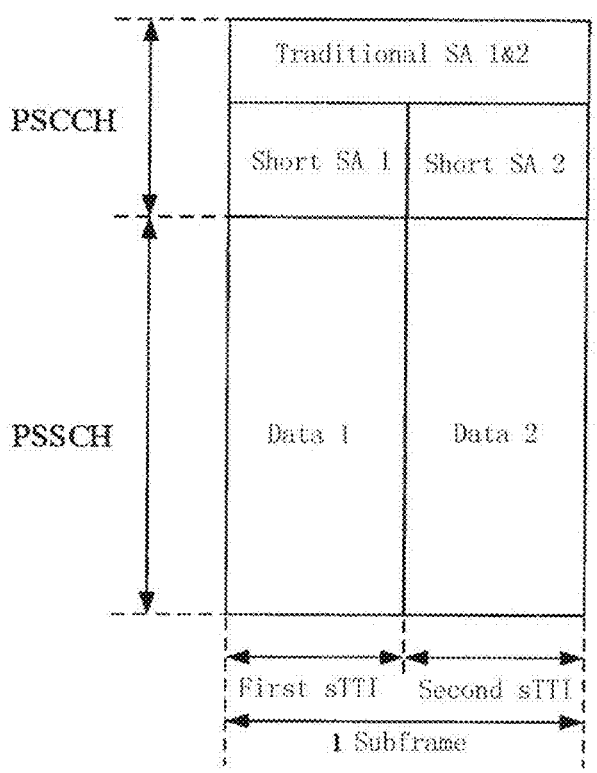

However, if the paired vehicles also have differences in other domains, then in order that a receiving party can successfully decode associated data, the paired vehicles each need to send one additional short SA, as shown in FIG. 15. The short SAs are SAs specific to the R15 vehicles, and do not need to be decoded by the R14 vehicles. With respect to the R14 SAs, if only the introduction of the sTTI is considered, time granularity of transmission is reduced by a half, then no addition of other domains is needed; however, content in some domains will have some changes on the basis of the R14 SAs, and according to the changes in the content, the bit numbers thereof may also be changed, which is specifically as shown in Table 3.

TABLE 3

| Domains | Bits | Descriptions | Analyses |
|---|---|---|---|
| Priority | 3 | set by an application layer | unchanged |
| Resource reservation | 4 (Option 1) 4~8 (Option 2) | always set all to 0 in Mode 3 | Mode 3: unchanged, Mode 4: Option 1: continue to use the value in R14; Option 2: a combination of the value in R14 with a smaller value (a new reservation time can be expressed by several kinds of undefined, reserved numerical values) |
| MCS | 5 | indicated in SL grant | unchanged |
| Frequency resource position of initial transmission and re-transmission | $\lceil \log_2 (N_{subchannel}^{SL} (N_{subchannel}^{SL} + 1)/2) \rceil$ | equal to RIV 5-13 bits | unchanged |
| Time interval of initial transmission and re-transmission | 4 (Option 1) 4~8 (Option 2) | indicating $SF_{gap}$ in SL grant | Option 1: continue to use the value in R14; Option 2: a combination of the value in R14 with a smaller value |
| Re-transmission index | 1 | — | unchanged |
| Reserved bit | — | — | — |

Scheme 3: Transmitting two SAs whose lengths are the TTI, respectively

Differing from the section of Scheme 2, if content essential for the perception operations of the paired vehicles cannot be placed in one traditional SA (this situation generally occurs in a scenario where pairable R15 vehicles are a few or where pairing occurs between the mode 4 vehicles), then it is necessary for the two vehicles to respectively send respective SAs, and in order to satisfy backward compatibility, the SAs shall be in a format identical to SCI format 1 and be sent with the TTI.

Although such SAs are sent with the TTI, in order to make a R15 receiver to obtain information needed for decoding, content of such SAs is distinguished from that of the traditional TTI, but bit numbers occupied by the respective domains are unchanged. Meanwhile, the content of such SAs is identical to the content of short SAs, but the bit number thereof may have a certain difference. Besides, since the two SAs are both transmitted on a same subframe and are both sent with the TTI, in order to distinguish which time slots are respectively indicated by the SAs, it is necessary to add "Time slot index", occupying 1 bit, in the reserved bit. In the present scheme, such SAs are called long SAs, and the specific content is as shown in Table 4. The italic parts in the table are domains essential for the perception operations, whose bit numbers and content shall be compatible with R14.

TABLE 4

| Domains | Bits | Descriptions | Analyses |
|---|---|---|---|
| Priority | 3 | set by an application layer | unchanged |
| Resource reservation | 4 | always be "0000" in Mode 3 | Unchanged in Mode 3. Its numerical value in Mode 4 shall be compatible with R14. The occupied bit number remains unchanged. |
| MCS | 5 | indicated in SL grant | unchanged |
| Frequency resource position of initial transmission and re-transmission | $\lceil \log_2 (N_{subchannel}^{SL} (N_{subchannel}^{SL} + 1)/2) \rceil$ | equal to RIV 5-13 bits | unchanged |
| Time interval of initial transmission and re-transmission | 4 (Option 1) | indicating $SF_{gap}$ in SL grant | Option 1: continue to use the value in R14; Option 2: a combination of the value in R14 with a smaller value, but with the bit number being unchanged. |
| Re-transmission index | 1 | — | unchanged |
| Reserved bit (Time slot index) | 1 | Indicating associated option 1: continue to use the value in R14; Option 2: a combination of the value in R14 with a smaller value, but with the bit number being unchanged. On which time slot data is transmitted. | It exists only in a long SA; its definition is defined in SIB. |
| Reserved bit | — | — | — |

Next, examples of selection and indication of a SA scheme will be described. For one R15 vehicle, there are a total of four possible SA sending manners, i.e., the three schemes proposed above, together with a scheme of initiatively sending one short SA in a case where the event is not triggered.

In the case of mode 3, the base station selects an SA sending scheme for the paired users, and decides by whom a SA is sent, and these information will be informed to the paired users in SL (sidelink) grant. The "SA index", occupying 2 bits, in the SL grant is defined, with its meaning being as shown in Table 5. In the case of mode 4, a manner of sending a SA is initiatively decided by the paired users according to a difference between information of both the parties in a pairing interaction process.

TABLE 5

Figure 16:
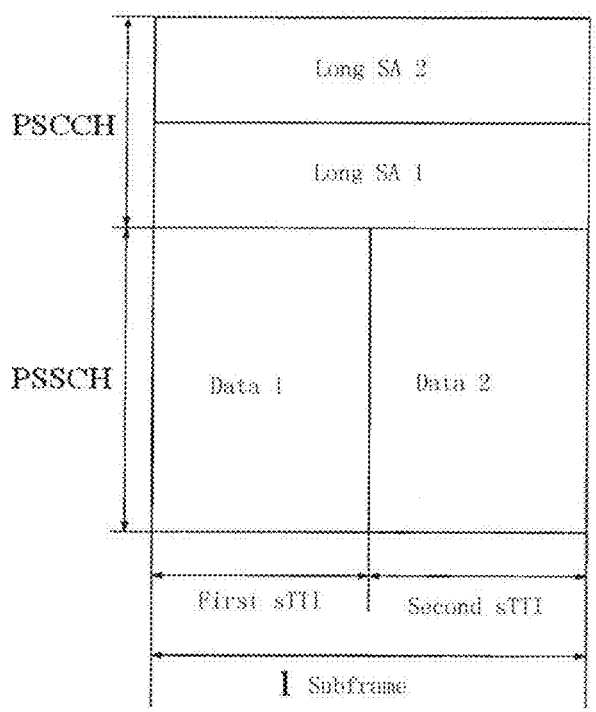

| SA Index | Meaning |
| --- | --- |
| 00 | send one R15 SA |
| 01 | send, together with a paired user, one traditional SA, as shown in FIG. 14 |
| 10 | send, together with a paired user, one traditional SA, and send one R15 SA by itself, as shown in FIG. 15 |
| 11 | send a long SA, as shown in FIG. 16 |

Continuing with the illustration of FIG. 3, according to an embodiment, the control circuit 310 can further comprise a generating unit 315 configured to generate indication information for indicating the transmission manner of the scheduling assignment signalling to the user equipment. For example, the indication information can be included in wireless resource control signalling or non-access stratum signalling.

Still taking R14, R15 vehicles as an example, for the vehicles within network coverage, after the event is triggered, the base station can, for example, inform the R15 vehicle by using one indication bit. The indication bit can be added in system control signalling, including but not limited to signallling such as RRC or NAS or the like. The indication bit is defined below by taking RRC signalling as an example.

For the R15 vehicle applying the sTTI to perform transmission, the indication bit can be defined as follows:

The indication bit is named "coordination index", occupies 1 bit in the RRC signalling, and notifies whether the R15 vehicle can initiatively transmit a SA and data with the sTTI in the current resource pool.

For example, when the "coordination index" is set to "0", the R15 vehicle can initiatively transmit a SA and data with the sTTI; and when the "coordination index" is set to "1", the mechanism in the embodiment as stated above will be adopted in resource (re-) selection/allocation and SA transmission.

It should be noted that, if the R14 and the R15 will co-exist only in some resource pools, numerical values of the "coordination index" may always be "0" in resource pools specific to the R15, and only after the R15 vehicle enters shared resource pools, the numerical values of the indication bit will be changed after the event is triggered.

Figure 4:
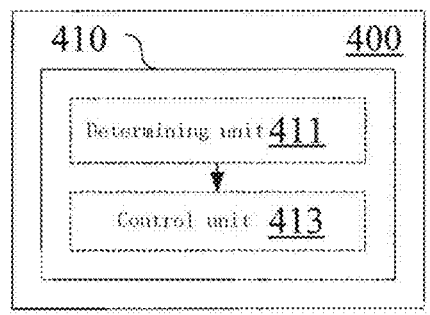
FIG. 4 is a block diagram showing a configuration example of an electronic device for wireless communication according to an embodiment of the present invention.

Next, an electronic device for wireless communication according to another embodiment will be explained with reference to FIG. 4. As shown in FIG. 4, an electronic device 400 according to the present embodiment comprises a processing circuitry 410, which comprises a determining unit 411 and a control unit 413.

The determining unit 411 is configured to, in a case where a user equipment performs a proximity-based service communication with a short transmission time interval which is less than a first transmission time interval, determine scheduling assignment signalling, which at least comprises one scheduling assignment signalling having a length equal to the first transmission time interval.

The control unit 413 is configured to perform a sidelink grant to perform control so as to transmit, in a same subframe, at least two transmission blocks each having a short transmission time interval, wherein the length of the subframe is equal to the first transmission time interval.

Figure 11:
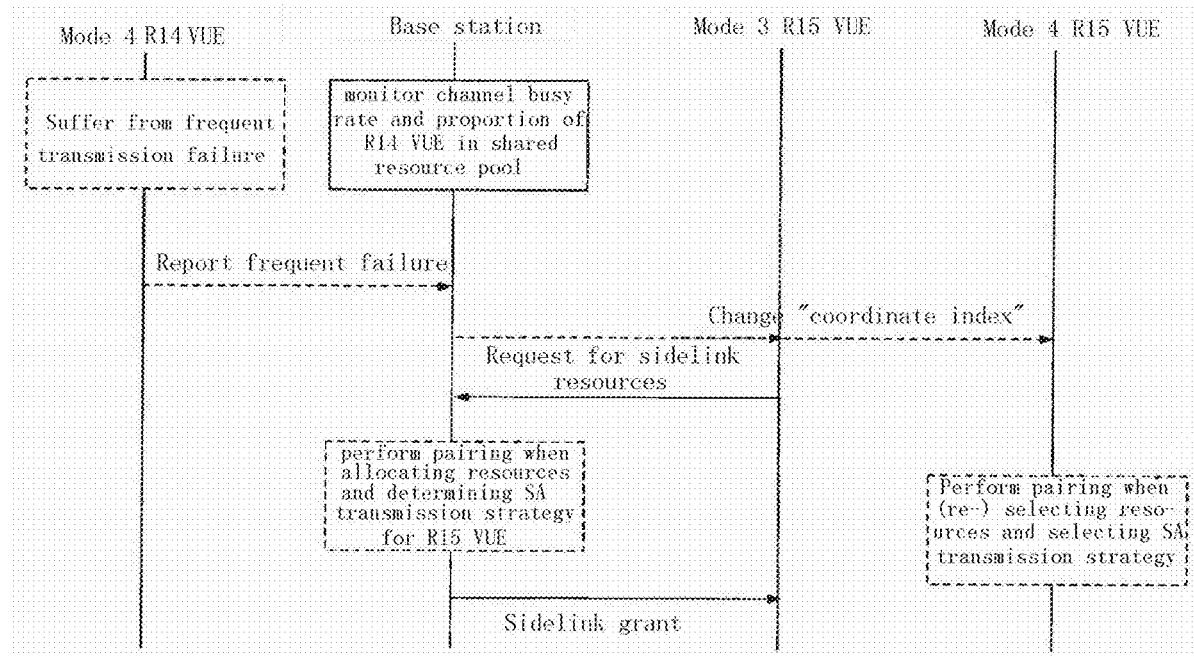
FIG. 11 is an overall flowchart for explaining an exemplary process performed between a base station and a user equipment according to an exemplary embodiment.

Next, with reference to FIG. 11, an overall process example relating to the above respective embodiments will be explained by taking VUEs as an example.

First, monitoring of a trigger condition is performed at base station side; in addition, the user equipment can perform reporting to the base station based on a predetermined condition.

When an event trigger condition is satisfied, the base station can notify, for example by means of the "coordination index", the user equipment to adopt a corresponding coordination mechanism.

For a Mode 3 R15 user equipment, it requests for sidelink resources from the base station, and the base station determines a pairing manner and the like, and performs a sidelink grant.

For a Mode 4 R15 user equipment, it can initiatively perform pairing.

Next, an exemplary process of pairing of a user equipment will be explained.

First, a pairing mechanism with respect to a Mode 3 vehicle will be described. In a process of scheduling resources for the mode 3 vehicle, the base station will implement a pairing mechanism.

Specifically, the following steps can be included:

First, when applying for resources, the mode 3 vehicle can upload a receiving party ID in domain "SidelinkUEInformation" of the RRC, upload a priority (PPPP) in domain "UEAssistanceInformation", upload detailed geographical location information in IE LocationInfo, and indicate in a BSR control unit a size of resources needed for its transmission.

Next, the base station will perform, according to the information uploaded by the vehicle, pairing for vehicles which simultaneously apply for resources, and its fundamental pairing principle is to make vehicles with a high similarity become paired vehicles as far as possible. If a number of continuous sTTIs needed for transmission of a R15 VUE is an even number, it is unnecessary to perform pairing.

Then, the base station allocates resources for the paired vehicles by taking a subframe as granularity, and indicates at which time slots the two perform transmission, respectively.

An object of paired transmission is to cause two independent sTTIs to be transmitted in one subframe, which, from the perspective of the R14 vehicle, is the same as transmitting one TTI in one R14 subframe. Therefore, the principle of pairing is to cause the paired users to be approximate in terms of transmitting power, occupied resource position and size as far as possible.

As stated previously, in the pairing criteria, priority is the most important factor, because it has a fixed numerical value (decided by the V2X service type of the vehicle) and decides the magnitude of transmitting power, as well as a processing manner in case of a conflict of sidelink transmission with uplink transmission. For two users performing transmission in a same subframe, it is firstly necessary to ensure that they have identical service priorities; it is secondly necessary to ensure that they are at close geographical locations, because times when the two send requests are very close, and moreover, in a same resource pool, determinants of MCS are mainly channel quality and bit error rate, and in this case, the base station can select same MCS for the users at close geographical locations; lastly, it is necessary to ensure that message sizes of the two are approximate, and when message sizes of the two are approximate and in the case that MCSs of the two are identical, the base station can allocate same numbers of subchannels for the two paired users. Priorities of the three criterions of selecting the paired vehicles from high to low may be: service priority, geographical location, and message size.

The pairing mechanism needs to compare, before allocating resources, information of vehicles which simultaneously perform transmission, such that sidelink transmission fills in one subframe as far as possible, and transmission information of the paired users do not greatly differ. Therefore, the mode 3, which is a centrally controlled scheduling manner, is more suitable for the pairing mechanism, but the pairing mechanism may also be used for a mode 4 user equipment.

Next, an example of a pairing mechanism with respect to a Mode 4 vehicle will be described.

In a scenario where the mode 4 vehicle adopts a pairing mechanism, specific flow may be outlined as follows:

First, the vehicle broadcasts a pairing request to surrounding vehicles, and pairable R15 mode 4 vehicles will reply to the request.

Next, the pairable vehicles within the communication range multicast, in a pairable vehicle group, transmission information thereof, including information on priority, geographical location, communication destination, message size and resource reservation.

Next, the vehicle will select, in a similar manner to that in the foregoing embodiment, a suitable vehicle to perform pairing. The paired vehicles can synthesize perception results of the two, and can select transmission resources and SA transmission schemes.

Figure 13:
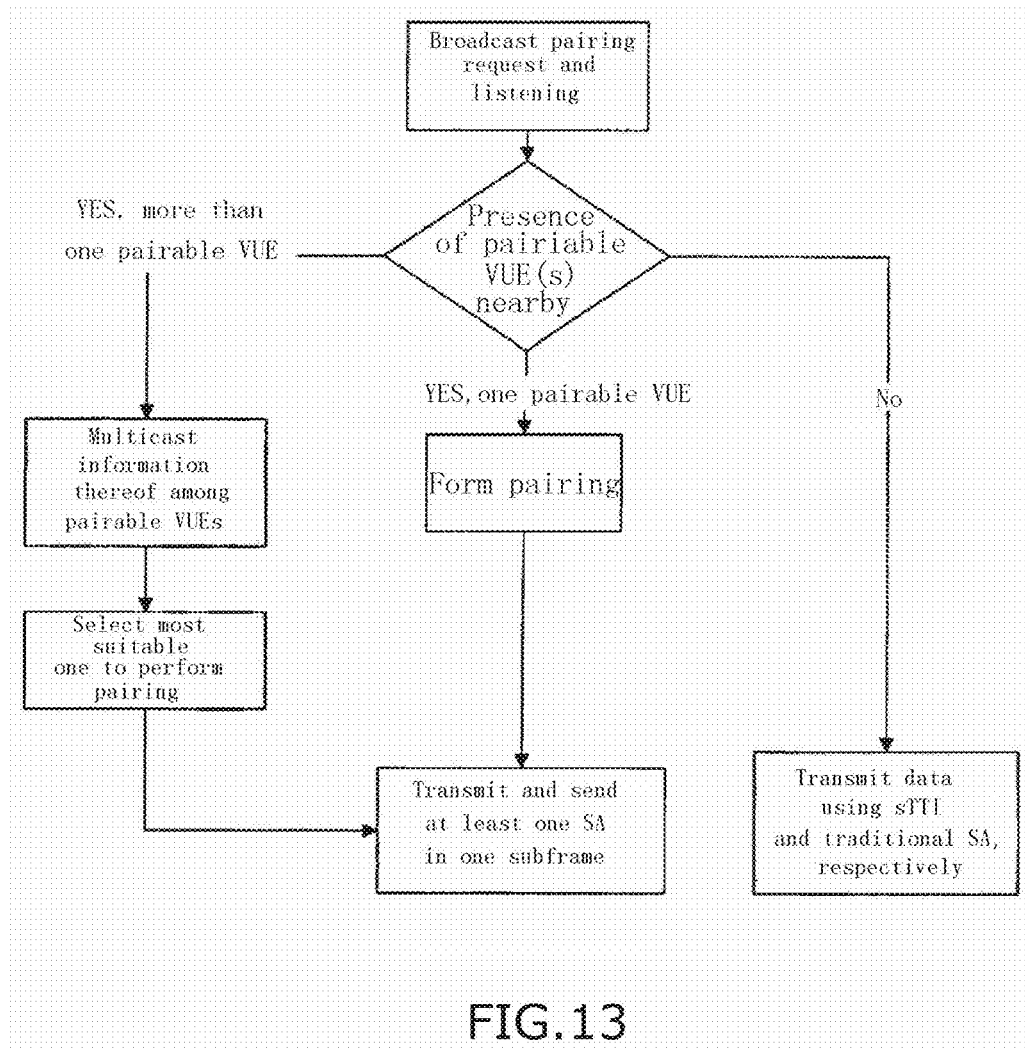
FIG. 13 is a flowchart for explaining a pairing process according to an exemplary embodiment.

An exemplary process of pairing with respect to the Mode 4 vehicle is as shown in FIG. 13.

Embodiments of electronic devices for wireless communication have been described above. Further, the present invention further comprises corresponding wireless communication apparatuses, which may comprise a transceiver device and the electronic devices according to the foregoing embodiments.

Further, in the foregoing description of the devices and the apparatuses according to the embodiments of the present invention, some methods and processes obviously have also been disclosed. Next, explanation of a wireless communication method according to an embodiment of the present invention will be given without repeating the details having been described previously.

Figure 5:
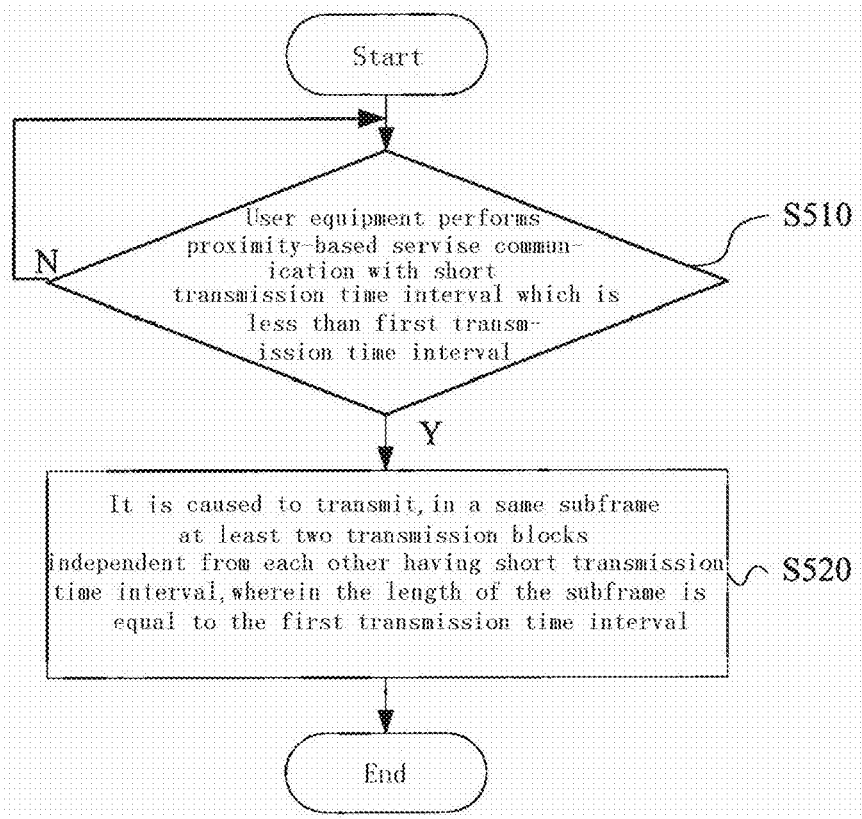
FIG. 5 is a flowchart showing a process example of a wireless communication method according to an embodiment of the present invention.

As shown in FIG. 5, in the wireless communication method according to the present embodiment, in a case where a user equipment performs a proximity-based service communication with a short transmission time interval which is less than a first transmission time interval (Y in S510), it is caused to transmit, in a same subframe, at least two transmission blocks independent from each other and each having a short transmission time interval (S520), wherein the length of the subframe is equal to the first transmission time interval.

The foregoing embodiments relate to pairing mechanisms with respect to vehicles for which resources are scheduled by the base station and which autonomously select resources. For the former, the eNodeB concentratedly schedules resources for a plurality of independent sTTI transmission; and for the latter, the vehicle will interact with surrounding vehicles, and pairable vehicles multicast their own transmission information within a range, so as to select a suitable vehicle to perform paired transmission.

Next, configuration examples of electronic devices for user equipment side according to embodiments of the present invention will be explained without repeating the details having been described previously.

Figure 6:
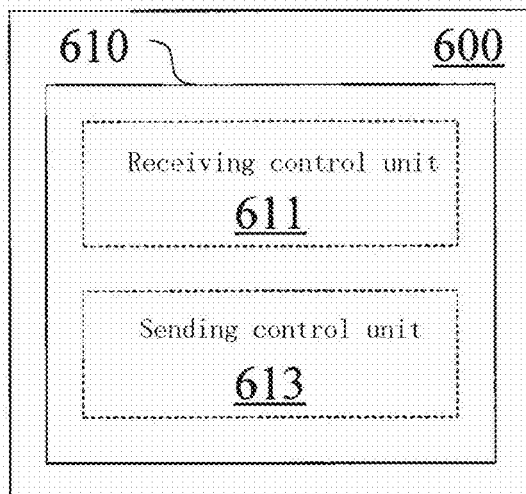
FIG. 6 is a block diagram showing a configuration example of an electronic device for user equipment side according to an embodiment of the present invention.

As shown in FIG. 6, an electronic device 600 for user equipment side according to an embodiment comprises a processing circuitry 610. The processing circuitry 610 comprises a receiving control unit 611 and a sending control unit 613.

The present embodiment corresponds to a user equipment (e.g., a Mode 3 R15 VUE) which uses a short transmission time interval.

The receiving control unit 611 is configured to perform control to receive indication information from a control node. The control node can, for example, comprise a base station, a RSU or another user equipment.

The sending control unit 613 is configured to, in a case where the user equipment performs a proximity-based service communication with a short transmission time interval less than a first transmission time interval, perform control based on the indication information such that a transmission block of the user equipment is transmitted in a same subframe with another transmission block having a short transmission time interval, wherein the length of the subframe is equal to the first transmission time interval.

The "another transmission block having a short transmission time interval" may comprise a transmission block of the present user equipment or a transmission block of another user equipment.

Figure 7:
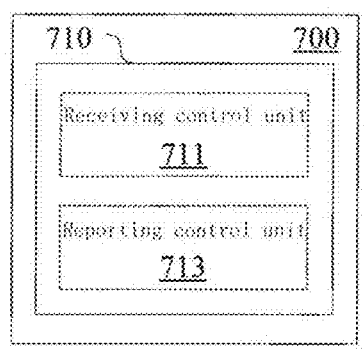
FIG. 7 is a block diagram showing a configuration example of an electronic device for user equipment side according to another embodiment of the present invention.
Figure 8:
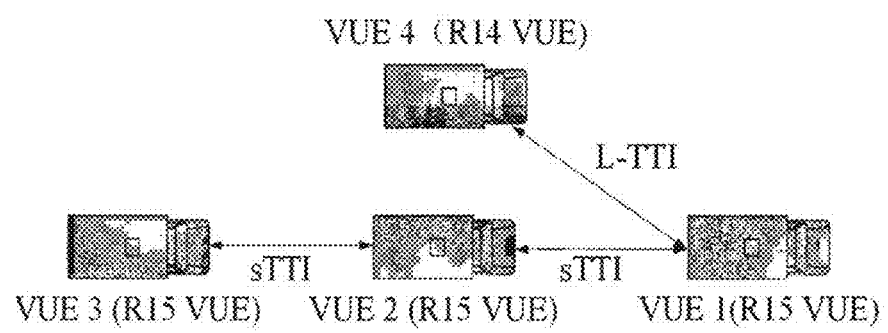
FIG. 8 is a schematic view showing a situation where user equipments using different transmission time intervals coexist, as an application scenario example of an embodiment of the present invention.
Figure 9:
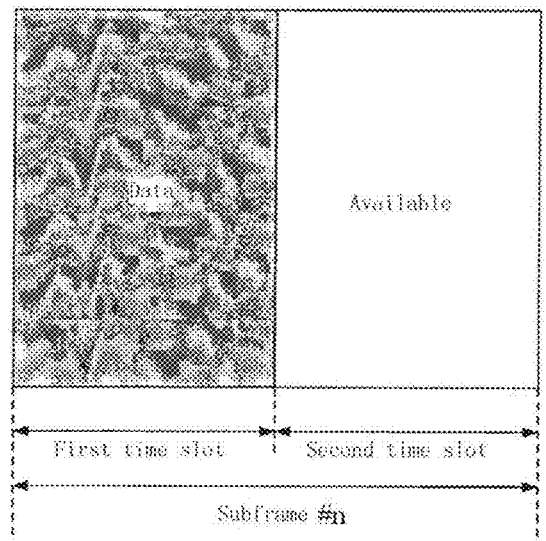
FIG. 9 shows an example of an actual occupation situation of a transmission subframe of a user equipment using a short transmission time interval.
Figure 10:
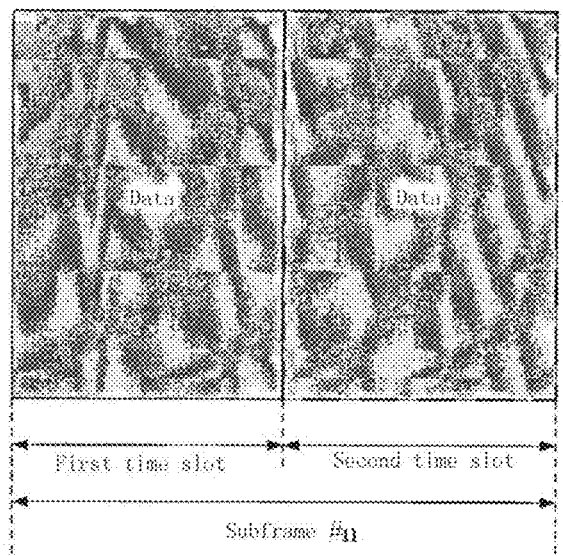
FIG. 10 shows an occupation situation of the subframe as shown in FIG. 9, at the perspective of a user equipment using a long transmission time interval.

As shown in FIG. 7, an electronic device 700 for user equipment side according to an embodiment comprises a processing circuitry 710. The processing circuitry 710 comprises a receiving control unit 711. Optionally, the processing circuitry 710 may further comprise a reporting control unit 713.

The present embodiment corresponds to a user equipment (e.g., a Mode 3 R14 VUE) which uses a long transmission time interval.

The receiving control unit 711 is configured to, in a case where the user equipment performs a proximity-based service communication with a first transmission time interval, perform control to receive scheduling assignment signalling associated with at least two transmission blocks, transmitted in a same subframe, which are independent from each other and each having a short transmission time interval less than the first transmission time interval, wherein the length of the subframe is equal to the first transmission time interval.

Further, the receiving control unit 711 can also be configured to perform control to perform a perception measurement on transmission blocks.

The reporting control unit 713 is configured to report corresponding indication information to a control node in a case where: the frequency of transmission failure of the user equipment reaches a predetermined level; or the proportion of undecodable scheduling assignment signalling received by the user equipment reaches a predetermined level.

Further, embodiments of the present application further comprise wireless communication apparatuses and wireless communication methods which correspond to the foregoing electronic devices 600, 700 for user equipment side.

In addition, embodiments of the present application further comprise an electronic device for wireless communication, comprising a control unit configured to, in a case where a user equipment performs a proximity-based service communication with a short transmission time interval which is less than a first transmission time interval, perform control so as to transmit, in a same subframe, at least two transmission blocks independent from each other and each having a short transmission time interval, wherein the length of the subframe is equal to the first transmission time interval.

Embodiments of the present application further comprise an electronic device for wireless communication, comprising: a determining unit configured to, in a case where a user equipment performs a proximity-based service communication with a short transmission time interval which is less than a first transmission time interval, determine scheduling assignment signalling which at least comprises one scheduling assignment signalling having a length equal to the first transmission time interval; and a control unit configured to perform control so as to transmit, in a same subframe, at least two transmission blocks each having a short transmission time interval, wherein the length of the subframe is equal to the first transmission time interval.

Embodiments of the present application further comprise an electronic device for user equipment side, comprising: a receiving control unit configured to perform control to receive indication information from a control node; and a sending control unit configured to, in a case where the user equipment performs a proximity-based service communication with a short transmission time interval less than a first transmission time interval, perform control based on the indication information such that a transmission block of the user equipment is transmitted in a same subframe with another transmission block having a short transmission time interval, wherein the length of the subframe is equal to the first transmission time interval.

Embodiments of the present application further comprise an electronic device for user equipment side, comprising: a control unit configured to, in a case where the user equipment performs a proximity-based service communication with a first transmission time interval, perform control to receive scheduling assignment signalling associated with at least two transmission blocks, transmitted in a same subframe, which are independent from each other and each having a short transmission time interval less than the first transmission time interval, wherein the length of the subframe is equal to the first transmission time interval.

Figure 17:
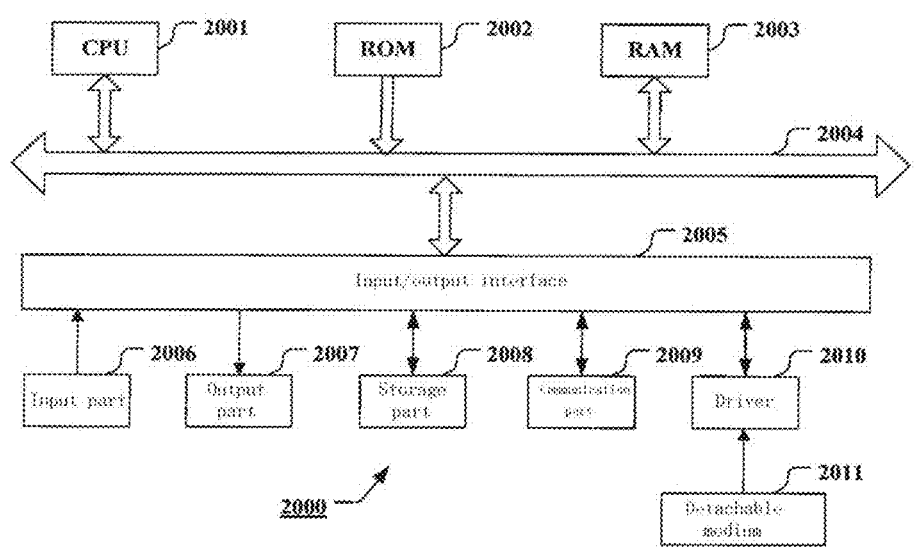
FIG. 17 is a block diagram showing an exemplary structure of a computer that realizes methods and apparatuses of the present disclosure.

As an example, the respective steps of the above method and the respective constituent modules and/or units of the above devices may be implemented as software, firmware, hardware or a combination thereof. In the case of implementation by software or firmware, a program constituting the software for implementing the above methods is installed from a storage medium or a network to a computer having a purpose-specific hardware structure (e.g., the universal computer 2000 as shown in FIG. 17). The computer, when installed with various programs, is capable of executing various functions and the like.

In FIG. 17, an operation processing unit (i.e., CPU) 2001 executes various processing according to a program stored in a Read-Only Memory (ROM) 2002 or a program uploaded from a storage part 2008 to a Random Access Memory (RAM) 2003. In the RAM 2003, data needed when the CPU 2001 executes various processing and the like is also stored as needed. The CPU 2001, the ROM 2002 and the RAM 2003 are linked to each other via a bus 2004. An input/output interface 2005 is also linked to the bus 2004.

The following components are linked to the input/output interface 2005: an input part 2006 (including a keyboard, a mouse and the like), an output part 2007 (including a display, such as a Cathode Ray Tube (CRT), a Liquid Crystal Display (LCD) and the like, as well as a speaker and the like), the storage part 2008 (including a hard disc and the like), and a communication part 2009 (including a network interface card such as an LAN card, a modem and the like). The communication part 2009 executes communication processing via a network such as the Internet. As needed, a driver 2010 may also be linked to the input/output interface 2005. A detachable medium 2011 such as a magnetic disc, an optical disc, a magnetic optical disc, a semiconductor memory and the like is installed on the driver 2010 as needed, such that a computer program read therefrom is installed in the storage part 2008 as needed.

In a case where the above series of processing is implemented by software, a program constituting the software is installed from a network such as the Internet or a storage medium such as the detachable medium 2011.

Those skilled in the art should appreciate that such a storage medium is not limited to the detachable medium 2011 having stored therein a program and distributed separately from an apparatus to provide the program to a user as shown in FIG. 17. Examples of the detachable medium 2011 include a magnetic disc (including a floppy disc (registered trademark)), a compact disc (including a Compact Disc Read-Only Memory (CD-ROM) and a Digital Versatile Disc (DVD)), a magneto optical disc (including a Mini Disc (MD) (registered trademark)), and a semiconductor memory. Alternatively, the storage medium may be hard discs and the like included in the ROM 2002 and the storage part 2008, in which programs are stored, and which are distributed concurrently with the apparatus including them to users.

Embodiments of the present invention further relate to a program product having stored therein machine readable instruction codes that, when read and executed by a machine, can execute the above method according to the embodiment of the present invention.

Accordingly, a storage medium for carrying the above program product having stored therein machine readable instruction codes is also included in the disclosure of the present invention. The storage medium includes but is not limited to a floppy disc, an optical disc, a magnetic optical disc, a memory card, a memory stick and the like.

Embodiments of the present invention further relate to an electronic apparatus. The electronic apparatus, when used for base station side, may be realized as any type of base station, such as gNB or Evolved node B (eNB), such as macro eNB and small eNB. The small eNB may be an eNB covering a cell smaller than a macro cell, such as a pico eNB, a micro eNB and a home (femto) eNB. Alternatively, the electronic apparatus may be realized as any other type of base station, such as NodeB and Base Transceiver Station (BTS). The electronic apparatus may comprise: a main body (also referred to as a base station equipment) configured to control wireless communication; and one or more Remote Radio Heads (RRHs) arranged at different places from the main body. In addition, all the various types of terminals which will be described below can operate as base stations by temporarily or semi-persistently executing base station functions.

The electronic apparatus, when used for user equipment side, may be realized as a mobile terminal (such as an intelligent telephone, a tablet Personal Computer (PC), a notebook PC, a portable game terminal, a portable/softdog mobile router and a digital camera) or an in-vehicle terminal (such as an automobile navigation equipment). In addition, the electronic apparatus may be a wireless communication module (such as an integrated circuit module including a single or more wafers) installed on each of the above terminals.

[Application Example with Regard to Terminal Equipment]

Figure 18:
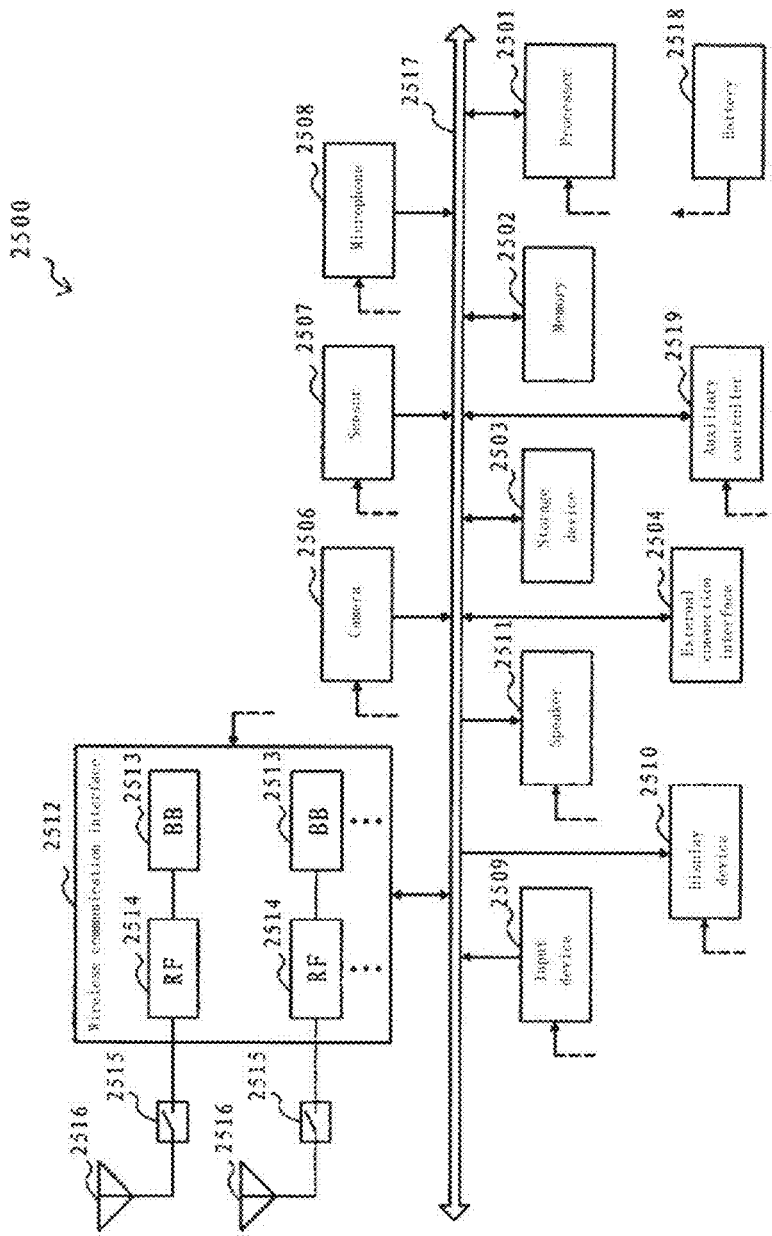
FIG. 18 is a block diagram showing an example of a schematic configuration of an intelligent telephone to which the technology of the present disclosure may be applied.

FIG. 18 is a block diagram showing an example of a schematic configuration of an intelligent telephone 2500 to which the technology of the present disclosure may be applied. The intelligent telephone 2500 comprises a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the intelligent telephone 2500. The memory 2502 comprises a RAM and a ROM, and stores data and programs executed by the processor 2501. The storage device 2503 may comprise a storage medium, such as a semiconductor memory and a hard disc. The external connection interface 2504 is used for connecting an external device (such as a memory card and a Universal Serial Bus (USB) device) to an interface of the intelligent telephone 2500.

The camera 2506 comprises an image sensor (such as a Charge Coupled Device (CCD) and a Complementary Metal Oxide Semiconductor (CMOS)), and generates a captured image. The sensor 2507 may comprise a group of sensors, such as a measurement sensor, a gyro sensor, a geomagnetic sensor and an acceleration sensor. The microphone 2508 converts sound inputted to the intelligent telephone 2500 to an audio signal. The input device 2509 comprises for example a touch sensor configured to detect a touch on a screen of the display device 2510, a keypad, a keyboard, a button or a switch, and receives an operation or information inputted from a user. The display device 2510 comprises a screen (such as a Liquid Crystal Display (LCD) and an Organic Light-Emitting Diode (OLED) display), and displays an output image of the intelligent telephone 2500. The speaker 2511 converts the audio signal outputted from the intelligent telephone 2500 to sound.

The wireless communication interface 2512 supports any cellular communication scheme (such as LTE and LTE-Advanced), and executes wireless communication. The wireless communication interface 2512 generally may comprise for example a Base Band (BB) processor 2513 and a Radio Frequency (RF) circuit 2514. The BB processor 2513 may execute for example coding/decoding, modulation/demodulation and multiplexing/demultiplexing, and execute various types of signal processing for wireless communication. Meanwhile, the RF circuit 2514 may comprise for example a frequency mixer, a filter and an amplifier, and transmit and receive a wireless signal via the antenna 2516. The wireless communication interface 2512 may be a chip module on which a BB processor 2513 and a RF circuit 2514 are integrated. As shown in FIG. 18, the wireless communication interface 2512 may comprise a plurality of BB processors 2513 and a plurality of RF circuits 2514. Although FIG. 18 shows an example in which the wireless communication interface 2512 comprises a plurality of BB processors 2513 and a plurality of RF circuits 2514, the wireless communication interface 2512 may also comprise a single BB processor 2513 or a single RF circuit 2514.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may comprise a BB processor 2513 and a RF circuit 2514 for each wireless communication scheme.

Each of the antenna switches 2515 switches a connection destination of the antenna 2516 between a plurality of circuits included in the wireless communication interface 2512 (for example, circuits for different wireless communication schemes).

Each of the antennas 2516 comprises a single or more antenna elements (such as a plurality of antenna elements included in an MIMO antenna), and is used for the communication interface 2512 to transmit and receive a wireless signal. As shown in FIG. 18, the intelligent telephone 2500 may comprise a plurality of antennas 2516. Although FIG. 18 shows an example in which the intelligent telephone 2500 comprises a plurality of antennas 2516, the intelligent telephone 2500 may also comprise a single antenna 2516.

In addition, the intelligent telephone 2500 may comprise an antenna 2516 for each wireless communication scheme. In this case, the antenna switches 2515 may be omitted from the configuration of the intelligent telephone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the intelligent telephone 2500 as shown in FIG. 18 via feeder lines which are partially shown as dashed lines in the figure. The auxiliary controller 2519 for example manipulates the least necessary function of the intelligent telephone 2500 in a sleep mode.

In the intelligent telephone 2500 as shown in FIG. 18, the transceiver device or unit of the wireless communication apparatus according to the embodiment of the present invention may be realized by the wireless communication interface 2512. At least part of the functions of the processing circuitry and/or respective units of the electronic device or information processing apparatus for wireless communication according to the embodiment of the present invention may also be implemented by the processor 2501 or the auxiliary controller 2519. For example, part of the function of the processor 2501 may be implemented by the auxiliary controller 2519 so as to reduce power consumption of the battery 2518. Further, the processor 2501 or the auxiliary controller 2519 may implement at least part of the functions of the processing circuitry and/or respective units of the electronic device or wireless communication apparatus according to the embodiment of the present invention by executing the program stored in the memory 2502 or the storage device 2503.

[Application Example with Regard to Base Station]

Figure 19:
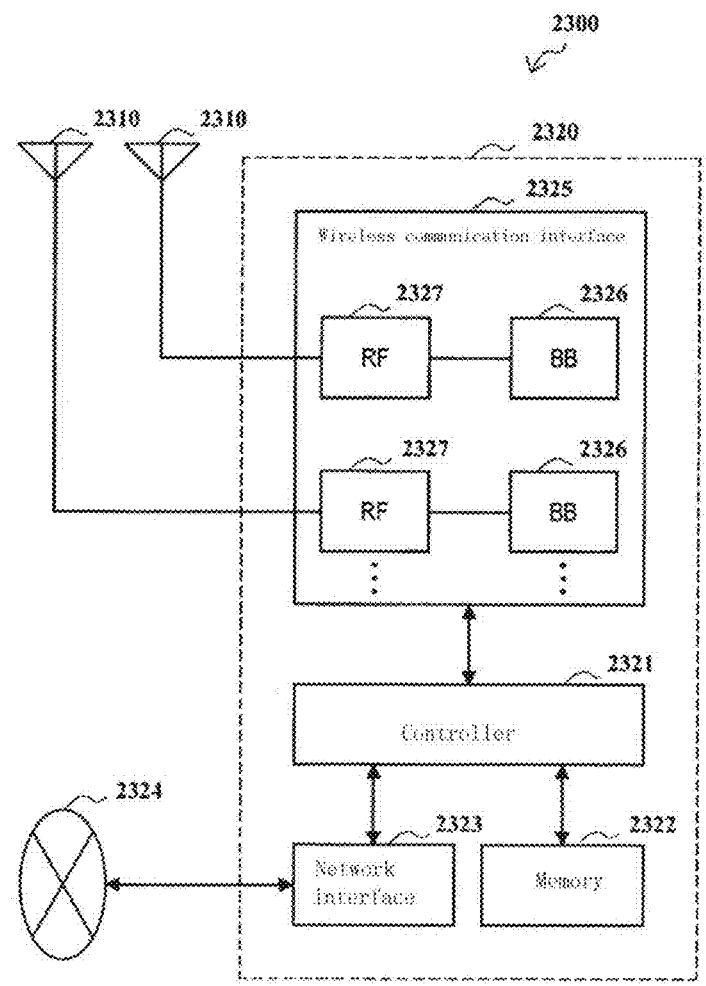
FIG. 19 is a block diagram showing an example of a schematic configuration of an eNB (Evolved Base Station) to which the technology of the present disclosure may be applied.

FIG. 19 is a block diagram showing an example of a schematic configuration of an eNB to which the technology of the present disclosure may be applied. The eNB 2300 comprises one or more antennas 2310 and a base station equipment 2320. The base station equipment 2320 and each antenna 2310 may be connected with each other via a radio frequency (RF) cable.

Each of the antennas 2310 comprises a single or more antenna elements (such as a plurality of antenna elements included in a Multiple-Input Multiple-Output (MIMO) antenna), and is used for the base station equipment 2320 to transmit and receive a wireless signal. As shown in FIG. 19, the eNB 2300 may comprise a plurality of antennas 2310. For example, the plurality of antennas 2310 may be compatible with a plurality of frequency bands used by the eNB 2300. Although FIG. 19 shows an example in which the eNB 2300 comprises a plurality of antennas 2310, the eNB 2300 may also comprise a single antenna 2310.

The base station equipment 2320 comprises a controller 2321, a memory 2322, a network interface 2323, and a wireless communication interface 2325.

The controller 2321 may be for example a CPU or a DSP, and manipulates various functions of a higher layer of the base station equipment 2320. For example, the controller 2321 generates data packets according to data in a signal processed by the wireless communication interface 2325, and transfers the generated packets via the network interface 2323. The controller 2321 may perform binding for data from a plurality of baseband processors to generate bound packets, and transfer the generated bound packets. The controller 2321 may have a logic function of executing control, which is such as radio resource control, radio bearer control, mobility management, admission control and dispatching. The control may be executed in combination with a nearby eNB or a core network node. The memory 2322 comprises a RAM and a ROM, and stores programs executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another eNB via the network interface 2323. In this case, the eNB 2300 and the core network node or another eNB may be connected to each other via a logic interface (such as S1 interface and X2 interface). The network interface 2323 may also be a wired communication interface, or a wireless communication interface for a wireless backhaul. If the network interface 2323 is a wired communication interface, as compared with frequency bands used by the wireless communication interface 2325, the network interface 2323 may use higher frequency bands for wireless communication.

The wireless communication interface 2325 supports any cellular communication scheme (such as Long Term Evolution (LTE) and LTE-Advanced), and provides a wireless connection to a terminal located in a cell of the eNB 2300 via the antenna 2310. The wireless communication interface 2325 generally may comprise for example a BB processor 2326 and a RF circuit 2327. The BB processor 2326 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 2321, the BB processor 2326 may have part or all of the above logic function. The BB processor 2326 may be a memory which stores a communication control program, or a module comprising a processor configured to execute a program and a related circuit. The function of the BB processor 2326 may be changed through program updating. The module may be a card or blade inserted in a slot of the base station equipment 2320. Alternatively, the module may also be a chip installed on a card or blade. Meanwhile, the RF circuit 2327 may comprise for example a frequency mixer, a filter and an amplifier, and transmit and receive a wireless signal via the antenna 2310.

As shown in FIG. 19, the wireless communication interface 2325 may comprise a plurality of BB processors 2326. For example, the plurality of BB processors 2326 may be compatible with a plurality of frequency bands used by the eNB 2300. As shown in FIG. 19, the wireless communication interface 2325 may comprise a plurality of RF circuits 2327. For example, the plurality of RF circuits 2327 may be compatible with a plurality of antenna elements. Although FIG. 19 shows an example in which the wireless communication interface 2325 comprises a plurality of BB processors 2326 and a plurality of RF circuits 2327, the wireless communication interface 2325 may also comprise a single BB processor 2326 or a single RF circuit 2327.

In the eNB 2300 as shown in FIG. 19, the transceiver device or unit of the wireless communication apparatus according to the embodiment of the present invention may be realized by the wireless communication interface 2325. At least part of the functions of the processing circuitry and/or respective units of the electronic device for wireless communication apparatus according to the embodiment of the present invention may also be implemented by the controller 2321. For example, the controller 2321 may implement at least part of the functions of the processing circuitry and/or respective units of the electronic device or wireless communication apparatus according to the embodiment of the present invention by executing a program stored in the memory 2322.

[Application Example with Regard to Automobile Navigation Equipment]

Figure 20:
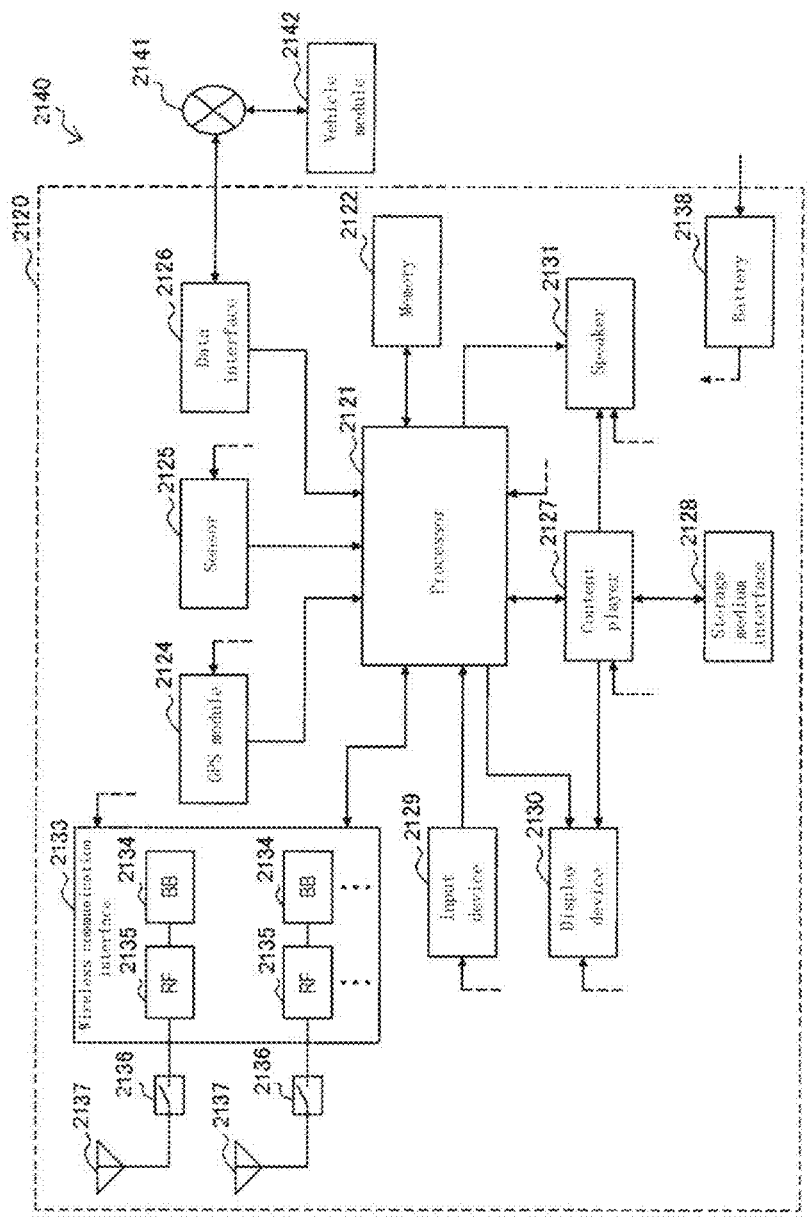
FIG. 20 is a block diagram showing an example of a schematic configuration of an automobile navigation equipment to which the technology of the present disclosure may be applied.

FIG. 20 is a block diagram showing an example of a schematic configuration of an automobile navigation equipment 2120 to which the technology according to the disclosure may be applied. The automobile navigation equipment 2120 comprises a processor 2121, a memory 2122, a Global Positioning System (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be for example a CPU or a SoC, and controls a navigation function and additional functions of the automobile navigation equipment 2120. The memory 2122 comprises a RAM and a ROM, and stores data and programs executed by the processor 2121.

The GPS module 2124 measures a position (such as a longitude, a latitude and an altitude) of the automobile navigation equipment 2120 by using a GPS signal received from a GPS satellite. The sensor 2125 may comprise a group of sensors, such as a gyro sensor, a geomagnetic sensor and an air pressure sensor. The data interface 2126 is connected to for example an in-vehicle network 2141 via a terminal which is not shown, and acquires data (such as vehicle speed data) generated by a vehicle.

The content player 2127 reproduces content stored in a storage medium (such as a CD and a DCD). The storage medium is inserted in the storage medium interface 2128. The input device 2129 comprises for example a touch sensor configured to detect a touch on a screen of the display device 2130, a button or a switch, and receives an operation or information inputted from a user. The display device 2130 comprises a screen such as an LCD or an OLED display, and displays an image of the navigation function or the reproduced content. The speaker 2131 outputs sound of the navigation function or the reproduced content.

The wireless communication interface 2133 supports any cellular communication scheme (such as LTE and LTE-Advanced), and executes wireless communication. The wireless communication interface 2133 generally may comprise for example a BB processor 2134 and a RF circuit 2135. The BB processor 2134 may execute for example coding/decoding, modulation/demodulation and multiplexing/demultiplexing, and execute various types of signal processing for wireless communication. Meanwhile, the RF circuit 2135 may comprise for example a frequency mixer, a filter and an amplifier, and transmit and receive a wireless signal via the antenna 2137. The wireless communication interface 2133 may also be a chip module on which a BB processor 2134 and a RF circuit 2135 are integrated. As shown in FIG. 20, the wireless communication interface 2133 may comprise a plurality of BB processors 2134 and a plurality of RF circuits 2135. Although FIG. 20 shows an example in which the wireless communication interface 2133 comprises a plurality of BB processors 2134 and a plurality of RF circuits 2135, the wireless communication interface 2133 may also comprise a single BB processor 2134 or a single RF circuit 2135.

In addition, besides the cellular communication schemes, the wireless communication interface 2133 may support other types of wireless communication schemes, such as a short range wireless communication scheme, a near field communication scheme and a wireless LAN scheme. In this case, for each wireless communication scheme, the wireless communication interface 2133 may comprise a BB processor 2134 and a RF circuit 2135.

Each of the antenna switches 2136 switches a connection destination of the antenna 2137 between a plurality of circuits included in the wireless communication interface 2133 (for example, circuits for different wireless communication schemes).

Each of the antennas 2137 comprises a single or more antenna elements (such as a plurality of antenna elements included in an MIMO antenna), and is used for the wireless communication interface 2133 to transmit and receive a wireless signal. As shown in FIG. 20, the automobile navigation equipment 2120 may comprise a plurality of antennas 2137. Although FIG. 20 shows an example in which the automobile navigation equipment 2120 comprises a plurality of antennas 2137, the automobile navigation equipment 2120 may also comprise a single antenna 2137.

In addition, the automobile navigation equipment 2120 may comprise an antenna 2137 for each wireless communication scheme. In this case, the antenna switches 2136 may be omitted from the configuration of the automobile navigation equipment 2120.

The battery 2138 supplies electric power to the respective blocks of the automobile navigation equipment 2120 as shown in FIG. 20 via feeder lines which are partially shown as dashed lines in the figure. The battery 2138 accumulates the electric power supplied from the vehicle.

In the automobile navigation equipment 2120 as shown in FIG. 20, the transceiver device or unit of the wireless communication apparatus according to the embodiment of the present invention may be realized by the wireless communication interface 2133. At least part of the functions of the processing circuitry and/or respective units of the electronic device or wireless communication apparatus according to the embodiment of the present invention may also be implemented by the processor 2121.

The technology of the disclosure may also be realized as an in-vehicle system (or vehicle) 2140 comprising one or more of the following blocks: the automobile navigation equipment 2120, the in-vehicle network 2141 and a vehicle module 2142. The vehicle module 2142 generates vehicle data (such as vehicle speed, engine speed and fault information), and outputs the generated data to the in-vehicle network 2141.

In the foregoing description of the detailed embodiments of the present invention, features described and/or shown with respect to one embodiment may be used in one or more other embodiments in an identical or similar manner, be combined with features in other embodiments, or substitute features in other embodiments.

It should be emphasized that, the term "comprise/include" used herein refers to existence of features, elements, steps or assemblies, but does not preclude existence or addition of one or more other features, elements, steps or assemblies.

In the above embodiments and examples, reference numerals composed of digits are used to represent the respective steps and/or units. Those ordinarily skilled in the art should understand that, these reference numerals aim only to facilitate description and plotting, but do not represent an order thereof or any other limitation.

Further, the methods of the present invention are not limited to be executed in the temporal order described in the specification, but may also be executed sequentially, in parallel or independently in other temporal orders. Therefore, the execution order of the methods described in the present specification does not constitute a limitation to the technical scope of the present invention.

Although the present invention has been disclosed above by the description of the detailed embodiments of the present invention, it should be understood that all the above embodiments and examples are exemplary but not imitating. Those skilled in the art could design various modifications, improvements or equivalents with regard to the present invention within the spirit and scope of the appended claims. These modifications, improvements or equivalents should also be construed as being included within the scope of protection of the present invention.

The invention claimed is:

1. An electronic device for wireless communication, comprising:
   a processing circuitry configured to:
      in a case where a user equipment performs a proximity-based service communication with one or more short transmission time intervals which are less than a first transmission time interval, perform control so as to transmit, in a same sidelink subframe, at least two non-overlapping transmission blocks independent from each other and each having respective transmission time intervals shorter than the first transmission time interval,
   wherein the length of the same sidelink subframe is equal to the first transmission time interval, and a length of the at least two non-overlapping transmission blocks is equal to the first transmission time interval,
   wherein the processing circuitry is configured to perform the control when a predetermined condition is satisfied, and
   wherein the predetermined condition comprises:
      a plurality of user equipments, including the user equipment, sharing a same resource pool perform proximity-based service communications with the first transmission time interval and the transmission time intervals shorter than the first transmission time interval, respectively, and at least one of:
- a channel busy rate of the resource pool is higher than a predetermined level;
- a number ratio of the plurality of user equipments using the first transmission time interval to the plurality of user equipments using the transmission time intervals shorter than the first transmission time interval is in a predetermined range,
- a frequency of transmission failure of any user equipment of the plurality of user equipments using the first transmission time interval reaches a predetermined level; or
- a proportion of undecodable scheduling assignment signaling received by any user equipment of the plurality of user equipments using the first transmission time interval reaches a predetermined level.

2. The electronic device according to claim 1, wherein a structure of the sidelink sub-frame is identical to that of a sidelink subframe of a proximity-based service communication performed with the first transmission time interval.

3. The electronic device according to claim 1, wherein the first transmission time interval includes 14 orthogonal frequency division multiplexing symbols, each of the transmission time intervals shorter than the first transmission time interval includes up to 7 orthogonal frequency division multiplexing symbols.

4. The electronic device according to claim 1, wherein the processing circuitry is configured to determine transmission blocks to be transmitted in the same sidelink subframe based on a priority of information to be transmitted.

5. The electronic device according to claim 1, wherein the at least two transmission blocks independent from each other are from the user equipment and a different user equipment, and the processing circuitry is configured to:
combine the user equipment and the different user equipment which use the transmission time intervals shorter than the first transmission time interval, such that transmission blocks of the combined user equipments are transmitted in the same sidelink subframe.

6. The electronic device according to claim 5, wherein the processing circuitry is configured to combine the user equipment and the different user equipment according to a similarity determined based on one or more of:
- a priority of information to be transmitted by the user equipment and the different user equipment;
- a data amount of information to be transmitted by the user equipment and the different user equipment;
- positions of the user equipment and the different user equipment; or
- movement speeds of the user equipment and the different user equipment.

7. The electronic device according to claim 1, wherein the processing circuitry is further configured to determine, according to transmission blocks to be transmitted in the same sidelink subframe, a transmission manner of scheduling assignment signalling or a content of the scheduling assignment signalling for the same sidelink subframe.

8. The electronic device according to claim 7, wherein the transmission manner of the scheduling assignment signalling comprises one of:
transmitting one scheduling assignment signalling having a length equal to the first transmission time interval;
transmitting one scheduling assignment signalling having a length equal to the first transmission time interval and n scheduling assignment signallings having lengths respectively corresponding to the transmission time intervals shorter than the first transmission time interval; or
transmitting n scheduling assignment signallings having a length equal to the first transmission time interval,
where n is the number of transmission blocks in the same sidelink subframe.

9. The electronic device according to claim 7, wherein the processing circuitry is configured to generate indication information for indicating the transmission manner of the scheduling assignment signalling to the user equipment.

10. The electronic device according to claim 9, wherein the indication information is included in wireless resource control signalling or non-access stratum signalling.

11. The electronic device according to claim 7, wherein the scheduling assignment signalling is realized by a Sidelink Control Information (SCI) format, the processing circuitry is further configured to add information related to a transmission resource into a reserved bit of the SCI format.

12. The electronic device according to claim 11, wherein the processing circuitry is configured to:
add information related to a transmission resource into a reserved bit of the scheduling assignment signalling; and
perform control to notify a definition of the added information to the user equipment in a system information block.

13. The electronic device according to claim 1, wherein the proximity-based service communication comprises: Machine Type Communication MTC, Device-to-Device D2D communication, Vehicle-to-X V2X communication, Internet of Things IOT communication.

14. The electronic device according to claim 1, which is realized at a base station side, a roadside equipment side or a user equipment side.

15. The electronic device according to claim 1, wherein the user equipment comprises a vehicle.

16. An electronic device for wireless communication, comprising:
a processing circuitry configured to:
in a case where a user equipment performs a proximity-based service communication with one or more short transmission time intervals which are less than a first transmission time interval, determine scheduling assignment signalling which at least comprises one scheduling assignment signalling having a length equal to the first transmission time interval; and
perform control so as to transmit, in a same sidelink subframe, at least two non-overlapping transmission blocks each having respective transmission time intervals shorter than the first transmission time interval, wherein the length of the same sidelink subframe is equal to the first transmission time interval and a length of the at least two non-overlapping transmission blocks is equal to the first transmission time interval,
wherein the control is performed when a predetermined condition is satisfied, and
wherein the predetermined condition comprises:
a plurality of user equipments, including the user equipment, sharing a same resource pool perform proximity-based service communications with the first transmission time interval and the transmission time intervals shorter than the first transmission time interval, respectively, and at least one of:
- a channel busy rate of the resource pool is higher than a predetermined level;
- a number ratio of the plurality of user equipments using the first transmission time interval to the plurality of user equipments using the transmission time intervals shorter than the first transmission time interval is in a predetermined range,
- a frequency of transmission failure of any user equipment of the plurality of user equipments using the first transmission time interval reaches a predetermined level; or
- a proportion of undecodable scheduling assignment signaling received by any user equipment of the plurality of user equipments using the first transmission time interval reaches a predetermined level.

17. A wireless communication method by an electronic device for wireless communication and that includes a processing circuitry, the method comprising:
- in a case where a user equipment performs a proximity-based service communication with one or more short transmission time intervals which are less than a first transmission time interval, transmitting, in a same sidelink subframe, at least two non-overlapping transmission blocks independent from each other and each having respective transmission time intervals shorter than the first transmission time interval,
- wherein the length of the same sidelink subframe is equal to the first transmission time interval and a length of the at least two non-overlapping transmission blocks is equal to the first transmission time interval,
- wherein the proximity-based service communication is performed when a predetermined condition is satisfied, and
- wherein the predetermined condition comprises:
  - a plurality of user equipments, including the user equipment, sharing a same resource pool perform proximity-based service communications with the first transmission time interval and the transmission time intervals shorter than the first transmission time interval, respectively, and
  - at least one of:
    - a channel busy rate of the resource pool is higher than a predetermined level;
    - a number ratio of the plurality of user equipments using the first transmission time interval to the plurality of user equipments using the transmission time intervals shorter than the first transmission time interval is in a predetermined range,
    - a frequency of transmission failure of any user equipment of the plurality of user equipments using the first transmission time interval reaches a predetermined level; or
    - a proportion of undecodable scheduling assignment signaling received by any user equipment of the plurality of user equipments using the first transmission time interval reaches a predetermined level.

* * * * *